United States Patent [19]
Cassidy

[11] Patent Number: 5,879,544
[45] Date of Patent: Mar. 9, 1999

[54] DIFFERENTIAL PRESSURE INDICATOR

[75] Inventor: Ronald F. Cassidy, Waterlooville, United Kingdom

[73] Assignee: Pall Corporation, East Hills, N.Y.

[21] Appl. No.: 597,032

[22] Filed: Feb. 5, 1996

[30] Foreign Application Priority Data

Feb. 6, 1995 [GB] United Kingdom .................. 9502248

[51] Int. Cl.⁶ .......................... B01D 35/143; G01L 7/16; G01L 19/08
[52] U.S. Cl. .............................. 210/90; 96/421; 73/744; 116/268
[58] Field of Search .......................... 210/90, 94; 73/744, 73/745, 746, 716, 717; 116/268, 281, 283, DIG. 42; 55/274, DIG. 34; 96/421

[56] References Cited

U.S. PATENT DOCUMENTS

| | | | |
|---|---|---|---|
| 199,157 | 1/1878 | Helwig | 73/744 |
| 1,275,180 | 8/1918 | Ellis | 73/744 |
| 3,045,826 | 7/1962 | Howard et al. | 210/90 |
| 3,140,690 | 7/1964 | Siebel | 116/70 |
| 3,237,454 | 3/1966 | Gray | 73/744 |
| 3,377,980 | 4/1968 | Schindel | 116/268 |
| 3,379,206 | 4/1968 | Whiting | 116/268 |
| 3,495,566 | 2/1970 | Pall | 116/70 |
| 3,502,048 | 3/1970 | Bentzen et al. | 210/90 |
| 3,815,542 | 6/1974 | Cooper | 116/70 |
| 4,172,971 | 10/1979 | Silverwater er al. | 200/82 E |
| 4,203,384 | 5/1980 | Silverwater | 116/267 |
| 4,378,692 | 4/1983 | Walle | 73/49.2 |
| 4,426,952 | 1/1984 | Crisp | 116/268 |
| 4,646,624 | 3/1987 | Stearns | 92/37 |
| 4,651,670 | 3/1987 | Silverwater | 116/268 |
| 4,717,472 | 1/1988 | Dberg | 210/90 |
| 4,745,876 | 5/1988 | Whiting | 116/268 |
| 4,932,205 | 6/1990 | Alderfer et al. | 60/39.091 |
| 5,331,856 | 7/1994 | Cassidy | 73/745 |
| 5,437,241 | 8/1995 | Rosenberg et al. | 116/268 |
| 5,501,791 | 3/1996 | Theisen et al. | 210/90 |

FOREIGN PATENT DOCUMENTS

| | | |
|---|---|---|
| 0173841 | 3/1986 | European Pat. Off. . |
| 0188156 | 7/1986 | European Pat. Off. . |
| 966980 | 8/1964 | United Kingdom . |
| 1221624 | 2/1971 | United Kingdom . |
| 1412023 | 10/1975 | United Kingdom . |
| 1476884 | 6/1977 | United Kingdom . |
| 1525350 | 9/1978 | United Kingdom . |
| 2207507 | 2/1989 | United Kingdom . |

*Primary Examiner*—Joseph W. Drodge
*Attorney, Agent, or Firm*—Leydig, Voit & Mayer

[57] ABSTRACT

A differential pressure indicator has a piston across which inlet and outlet pressures are applied with a spring preventing movement of the piston until a predetermined differential pressure is exceeded. At this point, a port is opened to allow the inlet pressure to be applied to an indicator button to move the indicator button from a retracted position to an operative extended position to indicate that the pressure differential has been exceeded. The use of fluid pressure to operate the indicator button applies a large force to the indicator button and allows it to be securely held in the inoperative position to guard against accidental movement by high G-forces.

22 Claims, 2 Drawing Sheets

DIFFERENTIAL PRESSURE INDICATOR

BACKGROUND OF THE INVENTION

1. Field of the Invention

The invention relates to differential pressure indicators.

2. Brief Review of the Prior Art

Differential pressure indicators are used to provide an indication, such as a visual indication or an electrical signal, when the difference between two fluid pressures exceeds a predetermined value. This is often achieved by applying the pressures to opposite sides of a piston which moves from an inoperative position to an operative position when the predetermined value is reached.

In one known indicator of this kind, the piston carries a rod which moves from a non-visible position to a visible position as the piston moves from the inoperative position to the operative position. The rod thus provides a visual indication that the predetermined pressure differential has been exceeded.

Such indicators are used, for example, in filters to indicate the onset of clogging of the filter element which increases the pressure differential upstream and downstream of the filter in the fluid being filtered.

SUMMARY OF THE INVENTION

According to the invention, there is provided a differential pressure indicator comprising a housing containing a piston having opposed first and second surfaces subject to respective higher and lower fluid pressures so that the piston moves from an inoperative position to an operative position when the difference between the higher and lower pressures exceeds a predetermined value, and an indicator being mounted in the housing and being movable between an inoperative position and an operative position to produce an indication. The indicator element includes a region acted on by one of the fluid pressures under the control of the piston so that said fluid pressure is applied to the region of the indicator element when the piston moves from said inoperative position.

In this way, the piston and the indicator element are not mechanically interlinked and this relieves various design constraints on the indicator. In addition, the fluid under pressure can apply a significant force to the indicator so providing a very positive indication and allowing the indicator element to be held securely in the inoperative position against accidental movement by G-forces.

BRIEF DESCRIPTION OF THE DRAWINGS

The following is a more detailed description of an embodiment of the invention, by way of example, reference being made to the accompanying drawings in which.

DESCRIPTION OF THE PREFERRED EMBODIMENT

Figure 1:
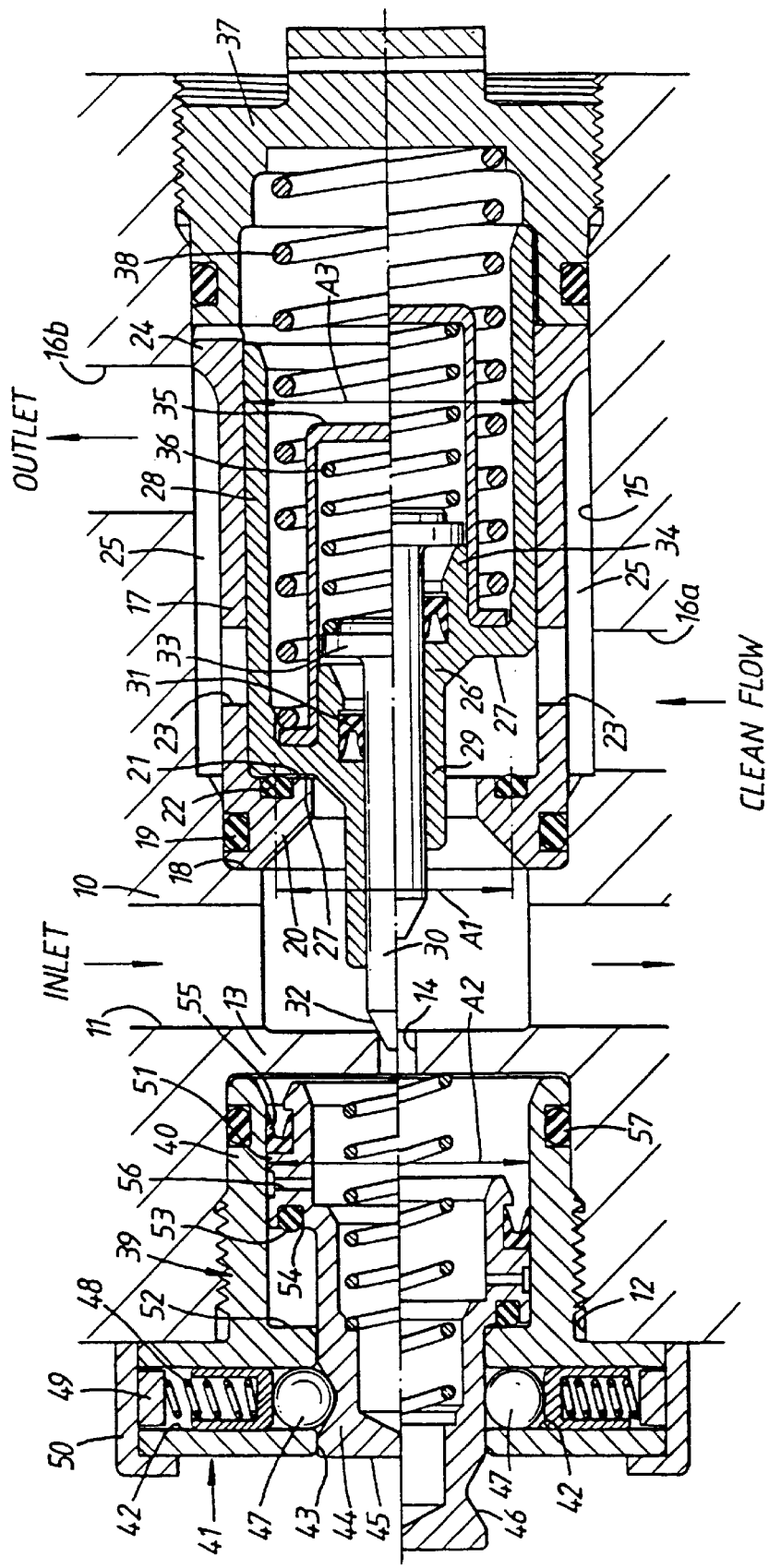
FIG. 1 is a schematic cross-section of a differential pressure indicator.

The differential pressure indicator 9 comprises a housing 10 having an inlet passage 11 extending through the housing 10. A first bore 12 is formed in the housing 10 to one side of the inlet passage 11, extending in a direction normal to the length of the inlet passage 11, and is separated from the inlet passage 11 by a wall 13 provided with a port 14.

On the opposite side of the inlet passage 11, the housing 10 is provided with a second bore 15 which extends normal to the length of the passage 11 and intersects the passage 11. An outlet passage has a first portion 16a leading into the bore 15 on one side of the bore and a second portion 16b leading from the bore 15 on a side of the bore diametrically opposed to, but axially staggered from, the outlet passage portion 16a.

The bore 15 receives an annular sleeve 17 having an end adjacent the inlet passage 11 which sits in an annular rebate 18 provided around the end of the bore 15. An 0-ring seal 19 carried on the outer surface of the sleeve 17 seals against the rebate.

The end of the sleeve 17 adjacent the inlet passage 11 is provided with an inwardly directed flange 20 having a radially extending surface 21 facing away from the inlet passage 11 and provided with an annular seal 22 for a purpose to be described below.

The sleeve 17 also has a pair of diametrically opposed apertures 23 which provide fluid communication between the interior and the exterior of the sleeve 17.

The end of the sleeve 17 remote from the inlet passage 11 is provided with an outwardly directed flange 24 that locates on the interior surface of the bore 15. There is thus formed between the outer surface of the sleeve 17 and the inner surface of the bore 15 an annular chamber 25 which is in communication with the outlet passage portions 16a and 16b.

A piston 26 is received in the sleeve 17 and is slidable relative to the sleeve 17. The piston 26 has a first working surface 27 which, in the inoperative position of the piston 26 shown in the upper part of the drawing, engages the seal 22 on the flange surface 21 of the sleeve 17. The piston 26 has a skirt 28 which, in this position, covers the apertures 23.

The centre of the working surface 27 is formed with a tube 29 which projects axially along the bore 15 into the inlet passage 11. A rod 30 is slidably mounted in this tube and a seal 31 carried by the tube 29 at an end of the tube 29 remote from the inlet passage 11 seals between the tube 29 and the rod 30. The rod 30 is provided with a pointed tip 32 at an end of the rod 30 projecting from the tube 29, and with an annular rib 33 at the opposite end within the piston 26. The interior of the piston 26 is provided with an annular flange 34 co-axial with the axis of the piston 26 and the rod 30.

The interior of the piston 26 also accommodates a cup 35 whose open end receives the flange 34 and the end of the rod 30 and the rib 33. A helical spring 36 acts between the closed end of the cup 35 and the rib 33 and, in the inoperative position of the piston 26 shown in the upper half of the drawing, loads the rod 30 so that the tip 32 is urged into the port 14 so sealing the port 14.

The end of the bore 15 remote from the inlet passage 11 is closed by a cup-shaped end closure 37 which is in threaded engagement with the bore 15. A rim at the open end of the end closure 37 engages an end of the sleeve 17 to urge the sleeve 17 against the rebate 18. In addition, a spring 38 acts between the closed end of the end closure 37 and the piston 26 to urge the piston 26 into the inoperative position shown in the upper half of the drawing where the working surface 27 engages the seal 22 on the flange surface 21. In this position, the tip 32 of the rod 30 is urged into the port 14 to prevent fluid communication between the inlet passage 11 and the first bore 12.

The first bore 12 is generally cylindrical with its axis coaxial with the axis of the second bore 15. The bore 12 contains an indicator device which comprises a mounting indicated generally at 39 and having a cylindrical portion 40 having an exterior screw thread in threaded engagement with a co-operating thread on the bore 12. The mounting 39 also has a head 41 provided with diametrically opposed bores 42 extending radially relative to the common axis of the first bore 12 and the second bore 15. The head 41 is provided with a central aperture 43 through which passes an indicator element comprising an indicator button 44 which is generally cylindrical in shape with a closed end wall 45. The upper half of the drawing shows the button 44 in an inoperative position where the end wall 45 is generally level with an end surface of the head 41. The button 44 is provided adjacent the end wall 45 with an exterior annular groove 46. Each bore 42 contains a ball 47 which, in the position of the button 44 shown in the upper half of the drawing, is urged into the groove 46 by an associated spring 48 carried in the associated bore 42 and acting between the ball 47 and a stop 49. The stops 49 are held in position by a retaining ring 50 engaging over the outer edge of the head 41.

The diameter of the aperture 43 is less than the internal diameter of the cylindrical portion 40 so that there is an annular step 52 between the aperture 43 and the inner surface of the cylindrical portion 40. Within the cylindrical portion 40, the button 44 is provided with an annular outer portion 51 which has an exterior surface in sliding engagement with the interior surface of the cylindrical portion 40. This portion 51 carries two seals: a first annular seal 53 carried by a radially extending annular face 54 facing the step 52 and an annular wiper seal 55 sealing between the portion 51 and the inner surface of the cylindrical portion 40. An orifice 56 extends through the portion 51 between the interior of the button 44 and the exterior of the button 44. It can be seen from FIG. 1 that the indicator button 44 includes a piston portion on which fluid pressure can act to move the indicator button 44 and an indicating portion which is associated with the piston portion and which produces an indication.

A further seal 57 seals between the exterior surface of the cylindrical portion 40 and the bore 12.

The differential pressure indicator operates as follows. The operation will be described in relation to its use in connection with a filter although it will be appreciated that it may operate similarly in other applications.

Figure 2:
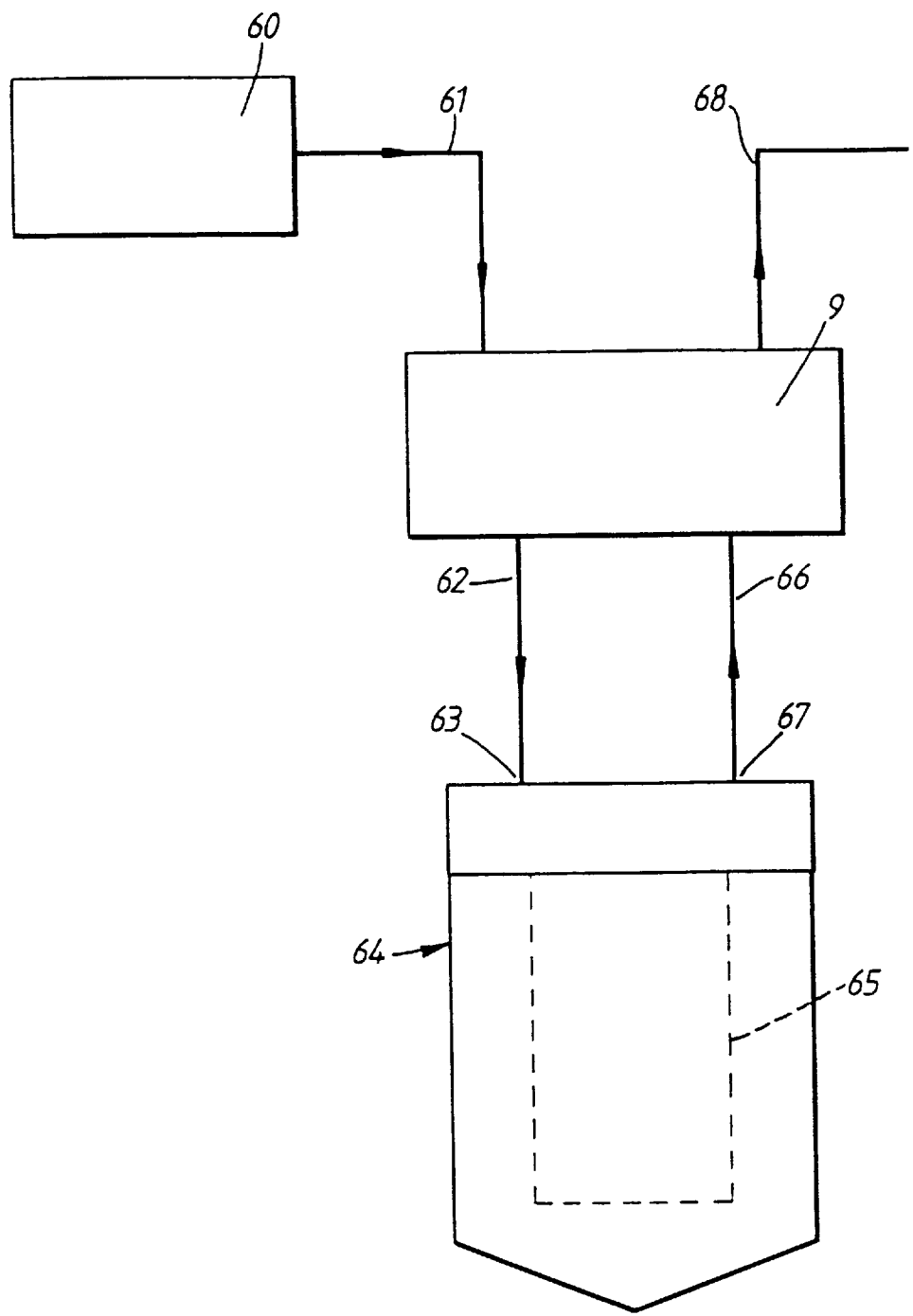
FIG. 2 is a schematic representation showing the indicator of FIG. 1 connected to a source of fluid to be filtered and a filter unit.

As shown in FIG. 2, a source 60 of fluid to be filtered is connected via a first conduit 61 to one end of the inlet passage 11. The other end of the inlet passage 11 is connected via a second conduit 62 to an inlet 63 of a housing 64 containing a filter element 65. A third conduit 66 is provided for conveying filtered fluid from an outlet 67 of the housing 64 to the outlet passage portion 16a and a fourth conduit 68 is connected to the outlet passage portion 16b for conveying filtered fluid away from the indicator device. In use, while the degree of clogging of the filter element 65 remains acceptable, fluid is passed from the source 60 via the inner passage 11 to the housing 64 where it is filtered and then passed through the indicator via the outlet passage portions 16a, 16b.

The inlet pressure acts on the area of the working surface 27 of the piston 26 indicated at Al in the drawing. The outlet fluid passing through the outlet passage portion 16a, 16b and the chamber 25 also passes through the apertures 23 in the sleeve 17 and then passes in both directions between the sleeve 17 and the skirt 28. This means that the outlet pressure acts both on the interior surface of the piston 26, applying the outlet pressure to an area indicated at A3 in the drawing, and also acts in the reverse direction on the portion of the working surface 27 between the annular seal 22 on the flange surface 21, and the outer surface of the skirt 28. Thus the outlet pressure acts on a net area which is equal to the area acted on by the inlet pressure.

The spring 38 acting between the end closure 37 and the piston 26 is designed to apply a force to the piston 26 holding the piston in an inoperative position until the difference between the inlet pressure and the outlet pressure exceeds a predetermined value. In the case of use with a filter element, this pressure difference is the difference at which the filter element reaches an unacceptable level of clogging.

At this point, the inlet pressure exceeds the outlet pressure by an amount such as to move the piston 26 relative to the sleeve 17 and against the action of the spring 38. After a short length of travel, the flange 34 engages the rib 33 on the rod 30 and the rod 30 begins to move with the piston 26. As a result of this, the tip 32 disengages from the port 14 to open the port 14. Thus, inlet fluid passes through the port 14.

The effect of this is to apply the inlet pressure to the piston portion of the button 44, with the pressure acting on an area indicated in the drawing as A2. The force generated is sufficient to overcome the detent provided by the balls 47 and to force the balls 47 out of the grooves 46 so allowing the button 44 to slide relative to the mounting 39 and the end of the button 44 to project from the mounting 39, so giving a visual indication that the predetermined pressure differential has been exceeded. At the end of its travel, the face seal 53 engages the step 52 to prevent leakage of the fluid through the head aperture 43.

The orifice 56 ensures that any leakage through the port 14 prior to movement of the piston 26 from the inoperative position simply passes through the orifice 56 and escapes through the head aperture 43.

The continued movement of the piston 26 away from the inoperative position moves the piston 26 to a position in which the skirt 28 at least partially uncovers the apertures 23. When this happens, inlet fluid from the inlet passage 11 flows past the piston 26, through the ports 23, into the chamber 25 and out through the passage 16b.

When the filter element has been replaced, the button can 44 can be manually pressed to re-engage with the balls 47 and the spring 38 will return the piston 26 to the inoperative position.

It will be appreciated that there are a number of variations that can be made to the arrangement described above. Although in the indicator shown in the drawing, movement of the piston 26 from the inoperative to the operative positions diverts the outlet flow back to the inlet, this is not essential. In addition, although the fluid pressure is applied to the button 44 by a rod opening a port, the rod/port combination is also not essential. The piston 26 could control the application of the inlet pressure to the button 44 in any suitable way. Indeed, it need not be the inlet pressure that is applied to the button 44; it could be the outlet pressure.

I claim:

1. A differential pressure indicator comprising a housing including a passage and an aperture, a piston disposed in the housing and having first and second surfaces subject to higher and lower fluid pressures, respectively, so that the piston moves from an inoperative position to an operative position when a difference between the higher and lower pressures exceeds a predetermined value, the passage in the housing being subjected to one of the higher and lower fluid pressures, an indicator element movably disposed in the housing, the indicator being constructed and arranged such that movement of the piston from its inoperative to its operative position controls an amount of fluid pressure applied to a region of the indicator element so as to enable one of the fluid pressures to move the indicator element from an inoperative to an operative position to provide an indication, and a valve connected to the piston for opening and closing the aperture to control fluid communication between the passage and the region of the indicator element and comprising a rod associated with the piston and having a tip that enters the aperture to close the aperture when the piston is in its inoperative position, the movement of the piston from its inoperative to its operative position removing the tip from the aperture to open the aperture to fluidly connect the region of the indicator element to the passage.

2. An indicator according to claim 1 wherein the piston is movable in a bore intersecting the passage, the aperture being provided in a wall of the passage opposite the bore, the rod projecting from the piston and extending across the passage to engage in the aperture.

3. An indicator according to claim 1 wherein the indicator element comprises a generally cylindrical member slidable in a bore in the housing and having an outer end which projects from the housing to provide a visual indication when the indicator element is in its operative position.

4. An indicator according to claim 3 including a detent mechanism which holds the indicator element in its inoperative position, the fluid pressure applied to the indicator element when the piston is in its operative position releasing the detent mechanism and moving the indicator element to project from the housing.

5. An indicator according to claim 4 wherein the detent mechanism includes at least one ball carried by the housing and urged resiliently in a radial direction into engagement with a recess on the indicator element, the fluid under pressure retracting the at least one ball to allow movement of the indicator element.

6. An indicator according to claim 5 wherein the detent mechanism includes two diametrically opposed balls, the recess comprising a groove extending in a circumferential direction of the indicator element.

7. An indicator according to claim 1 wherein the indicator element is moved to its operative position by the higher pressure.

8. An indicator according to claim 7 wherein the housing is provided with a first passage for fluid at the higher pressure and a second passage for fluid at the lower pressure, the piston controlling communication between the first and second passages so that when the piston is in its inoperative position, the first and second passages do not communicate with each other within the housing and so that when the piston is in its operative position, the first and second passages communicate with each other within the housing.

9. An indicator according to claim 1 wherein the indicator element includes an indicating portion which produces an indication when the indicator element is in its operative position.

10. An indicator according to claim 9 wherein the indicating portion produces a visual indication visible from outside the housing when the indicator element is in its operative position.

11. An indicator according to claim 10 wherein the indicating portion extends outside the housing when the indicator element is in its operative position.

12. An indicator according to claim 9 wherein the indicating portion is integrally formed with the region of the indicator element to which fluid pressure is applied.

13. An indicator according to claim 1 wherein the indicator element is slidably received in a bore in the housing, the indicator including a leakage path to vent off fluid leaking through the aperture into the bore receiving the indicator element when the piston is in its inoperative position.

14. A differential pressure indicator comprising a housing including a passage and an aperture, a piston disposed in the housing and having first and second surfaces subject to higher and lower fluid pressures, respectively, so that the piston moves from an inoperative position to an operative position when a difference between the higher and lower pressures exceeds a predetermined value, the passage in the housing being subjected to one of the higher and lower fluid pressures, an indicator element comprising a generally cylindrical member slidably received in a bore in the housing, the aperture being disposed between the passage and the indicator element, the indicator being constructed and arranged such that movement of the piston from its inoperative to its operative position controls an amount of fluid pressure applied to a region of the indicator element so as to enable one of the fluid pressures to move the indicator element from an inoperative position to an operative position in which an outer end of the indicator element projects from the housing to provide a visual indication, and a valve connected to the piston for opening and closing the aperture to control fluid communication between the passage and the region of the indicator element, the movement of the piston from its inoperative to its operative position operating the valve to open the aperture to fluidly connect the region of the indicator element to the passage, the indicator including a leakage path to vent off fluid leaking through the aperture into the bore receiving the indicator element when the piston is in its inoperative position.

15. A filter assembly comprising a filter housing having an inlet and an outlet, a filter element disposed within the filter housing for receiving fluid at an inlet pressure from the inlet to be filtered and providing filtered fluid at an outlet pressure to the outlet for discharge from the housing, and a differential pressure indicator indicating when a pressure differential between the inlet and the outlet pressures exceeds a predetermined value and comprising:

an indicator housing;
  a piston movably disposed in the indicator housing and having first and second surfaces respectively subject to the inlet and outlet fluid pressures so as to move from an inoperative position to an operative position when the pressure differential exceeds the predetermined value; and
  an indicator element movably disposed in the indicator housing, the indicator being constructed and arranged such that movement of the piston from its inoperative to its operative position controls an amount of fluid pressure applied to a region of the indicator element so as to enable one of the fluid pressures to move the indicator element from an inoperative to an operative position to produce an indication.

16. A filter assembly according to claim 15 wherein the indicator element is slidably received in a bore in the indicator housing.

17. A filter assembly according to claim 16 wherein the indicator housing includes a leakage path to vent off fluid leaking into the bore receiving the indicator element from a region of the indicator housing communicating with the piston when the piston is in its inoperative position.

18. A filter assembly according to claim 16 wherein the indicator housing includes an aperture adjoining the bore receiving the indicator element, movement of the piston from its inoperative to its operative position opening the aperture to provide fluid communication through the aperture between the indicator element and the piston.

19. A filter assembly according to claim 18 including a rod associated with the piston and having a tip that closes the aperture when the piston is in its inoperative position, movement of the piston to its operative position removing the tip from the aperture to open the aperture.

20. A filter assembly according to claim 15 wherein the indicator element comprises a button which is manually movable from its operative to its inoperative position.

21. A filter assembly according to claim 15 wherein the indicator element projects from the housing to provide a visual indication when the indicator element is in its operative position.

22. A differential pressure indicator comprising:

a housing having first and second regions and an aperture;

a piston disposed in the housing for movement between an inoperative and an operative position, the piston having first and second surfaces fluidly communicating with the first and second regions of the housing, respectively, the piston moving from its inoperative position to its operative position when a pressure differential between the first and second regions of the housing exceeds a predetermined value;

an indicator element disposed in the housing for movement between an inoperative position and an operative position producing an indication, the aperture being disposed between the indicator element and the first region of the housing; and a rod connected to the piston and movable by the piston between a position in which a tip of the rod enters the aperture to close the aperture and prevent fluid communication between the indicator element and the first region of the housing and a position in which the tip of the rod is removed from the aperture to allow fluid communication between the indicator element and the first region of the housing.

\* \* \* \* \*